US012583587B2

(12) United States Patent
Meiranke et al.

(10) Patent No.: US 12,583,587 B2
(45) Date of Patent: Mar. 24, 2026

(54) MOVABLE CARGO SUPPORT HAVING VERTICALLY BIASED WHEEL MEMBERS

(71) Applicant: Airbus Operations GmbH, Hamburg (DE)

(72) Inventors: Dirk Meiranke, Hamburg (DE); Ralf Schliwa, Hamburg (DE); Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 485 days.

(21) Appl. No.: 18/191,210

(22) Filed: Mar. 28, 2023

(65) Prior Publication Data

US 2024/0116633 A1 Apr. 11, 2024

(30) Foreign Application Priority Data

Mar. 31, 2022 (EP) ..................................... 22165946

(51) Int. Cl.
*B64D 9/00* (2006.01)
*B64C 1/20* (2006.01)

(52) U.S. Cl.
CPC ............... *B64D 9/003* (2013.01); *B64C 1/20* (2013.01)

(58) Field of Classification Search
CPC .... B64D 9/003; B64D 2009/006; B64D 9/00; B64C 1/20
See application file for complete search history.

(56) References Cited

U.S. PATENT DOCUMENTS

H1767 H * 1/1999 Davis ........................... 89/40.08

FOREIGN PATENT DOCUMENTS

| GB | 624303 A | 1/1949 |
| JP | 2004284528 A | 10/2004 |
| WO | 2019229844 A1 | 5/2019 |

OTHER PUBLICATIONS

JP 2004284528 A Espace MTL (Year: 2004).*
WO 2019229844 A1 Espace MTL (Year: 2019).*
European Search Report for Application No. 22165946 dated Aug. 18, 2022.

* cited by examiner

*Primary Examiner* — Jason D Shanske
*Assistant Examiner* — Al-Birr Rahman Chowdhury
(74) *Attorney, Agent, or Firm* — KDW Firm PLLC

(57) ABSTRACT

A movable cargo support for an aircraft cargo hold or passenger cabin includes a base. The base has a bottom surface with support(s) to support the base member on a floor surface of the cargo hold or passenger cabin. The base has wheel assemblies, each wheel assembly having at least one wheel rotatable about a rotation axis and movably mounted on the base to pivot about a steering axis of the wheel assembly. The at least one wheel of each wheel assembly is movable between an extended position, in which the at least one wheel protrudes beyond the support plane, and a retracted position, in which the at least one wheel does not extend beyond the support plane. Each wheel assembly has a biasing member for biasing the at least one wheel towards the extended position.

20 Claims, 7 Drawing Sheets

MOVABLE CARGO SUPPORT HAVING VERTICALLY BIASED WHEEL MEMBERS

TECHNICAL FIELD

The disclosure herein relates to a movable cargo support for being received the cargo hold or passenger cabin of an aircraft.

BACKGROUND

Recently it has become more desirable that the passenger cabin of an aircraft may be used in a more flexible manner. In particular, since the number of passengers during flights varies to a larger extent than in the past, it is often desired that part of the passenger cabin may also be used for cargo. To this end cargo supports which are movable along the floor of the passenger cabin have been developed.

In this regard it is to be noted that the term "cargo support" in the sense of the disclosure herein has a broad meaning and covers any kind of support member which is configured to carry cargo elements such as large items, luggage etc. and has a base member comprising a bottom surface and a support surface, the support surface being configured to support the cargo elements. However, it is not required that the cargo support also comprises flexible or rigid wall members such as lateral and top walls which define a receiving space for the cargo elements. Instead, such wall members are merely optional, and the term "cargo support" encompasses also those supports that do not comprise a flexible or rigid enclosure for the cargo elements.

However, the floor of the passenger cabin of an aircraft is often configured such that it may only bear limited point loads. This in turn limits the maximum weight that can be carried by a cargo support especially, when the latter comprises wheels on its bottom surface so as to allow to move the cargo support along the floor surface. These wheels may apply significant point loads to the floor surface especially during landing when high inertia forces in the Z-direction occur in addition to the gravitational forces.

On the other hand such wheels are required, since the passenger cabin does not comprise a cargo loading system, i.e., means on the floor of the passenger cabin that move cargo supports along the floor surface, and the cargo supports have to be moved to the desired position in the cabin by personnel.

In order to increase the maximum weight carried by a cargo support in the passenger cabin, the supports may be arranged such that they vertically abut on the seat rails which may carry higher loads than other regions of the floor of the passenger cabin. However, this requires that the entire cargo support is lowered to such an extent that support sections on the bottom surface of the cargo support will rest on the seat rails. In order to achieve this the wheel members must be vertically adjustable, and the position must be actively adapted when the cargo supports have reached their final positions in the passenger cabin.

Another problem with the cargo supports having wheels at its bottom surface occurs when such supports are maneuvered across elements projecting from other portions of the floor surface such as steps are seat rails. After having passed such elements the wheels on the bottom surface of the cargo supports will impinge onto the lower regions of the floor which results in high point loads in those regions adjacent to the aforementioned elements having a greater height.

SUMMARY

Hence, it is an object of the disclosure herein to provide a cargo support which may be maneuvered over a floor surface on wheels wherein the maximum loads applied to the surface is limited both when the cargo support is maneuvered and after having reached its final position.

This object is achieved by a movable cargo support for being received in the cargo hold or passenger cabin of an aircraft comprising:

a base member having a support surface and a bottom surface opposite the support surface, wherein the support surface is adapted to support one or more cargo elements, wherein the bottom surface comprises one or more support sections, which are adapted to support the base member on a floor surface, and wherein the one or more support sections extend in a common support plane, wherein the base member comprises a plurality of wheel assemblies, wherein each wheel assembly comprises a wheel member which may rest on a floor surface and is rotatable about a rotation axis that is parallel to the support plane, the wheel member being movably mounted on the base member such that it may pivot about a steering axis of that wheel assembly which steering axis extends perpendicular to the support plane and that its position parallel to the steering axis may be altered between an extended position and a retracted position, wherein in the extended position the wheel member protrudes beyond the support plane, wherein in the retracted position the wheel member is retracted from the support plane towards the support surface, so that it does not extend beyond the support plane, wherein each wheel assembly comprises a biasing member biasing the wheel member towards the extended position with a biasing force acting in the direction of the pivot axis, and wherein the biasing member is configured such that the biasing force is higher than the maximum gravitational force which acts on the wheel member and forces it towards the retracted position when the wheel members are placed on a horizontal floor surface and one or more cargo elements are placed on the support surface having the maximum allowable weight of the one or more cargo elements for the cargo support and wherein the biasing force exceeds the maximum gravitational force by 50% at most.

Hence, the cargo support of the disclosure herein comprises a base member or base plate which is provided with a normally upwards pointing support surface and a downward pointing bottom surface so that the latter is opposite the support surface. The support surface is adapted to carry one or more cargo element wherein the term "cargo element" in the sense of the disclosure herein is to be understood broadly, i.e., it covers luggage, large items etc. Furthermore, the disclosure herein does not require that the cargo support comprises rigid or flexible wall members defining a receiving space. Instead, the disclosure herein also covers cargo supports being merely in the form of a plate member and do not comprise wall elements encompassing a space for receiving the cargo elements.

The bottom surface of the base member comprises one or more support sections which are configured such that they extend in a common support plane and the base member is adapted such that it may be supported on a horizontal floor surface by the support sections which then are in contact with the floor surface, i.e., the entire bottom surface of the base member is configured such that it does not comprise additional elements which permanently extend beyond the common support plane and prevent the support sections from being in direct contact with a floor surface.

Moreover, according to the disclosure herein the base member comprises a plurality of wheel assemblies each of them comprising a wheel member which is rotatable about a rotation axis extending parallel to the support plane. The wheel member of each of the wheel assemblies is steerable, i.e., it may pivot about a steering axis of the respective wheel assembly which extends perpendicularly to the support plane. In addition, for the wheel member of each of the wheel assemblies the position relative to the steering axis may be altered between an extended position and a retracted position such that the wheel member may project beyond the common support plane when being in the extended position and being retracted towards the support surface so that it does not extend beyond the common support plane.

Finally, each wheel assembly is provided with a biasing member that biases the wheel member into the extended position. The biasing member is configured such that the biasing force acting on the wheel member is chosen such that it is higher than the maximum gravitational force which is applied to the wheel member when the support surface carries the maximum allowable weight and which forces the wheel member towards the retracted position. Further the biasing force exceeds the maximum gravitational force 50% at most, i.e., the biasing member exerts a force on the wheel member which pushes the wheel member towards the extended position and which is 1.5 times as high as the maximum gravitational force as specified before.

With this latter feature is achieved that even when the cargo support of the disclosure herein carries cargo elements having the maximum allowable weight, the wheel members of the wheel members are in the extended position so that the cargo support may be maneuvered across a floor surface of a cargo hold or passenger cabin with the wheel members rolling thereon. However, when for example during landing in addition to the gravitational forces further inertia forces act in the vertical direction and the biasing force is exceeded, the wheel members will be shifted towards the retracted position so that the support sections of the base member will come into contact with the floor surface or at least projecting members thereon and high point loads due to the limited contact surface between the wheel members and the floor surface are avoided in such situations. In particular, in order to ensure that in case of high forces acting in the direction perpendicular to the floor surface no extreme point loads will be applied to the floor surface, it is not necessary with the design of the disclosure herein to lower the cargo support by actively retracting the wheel members such as by actuating a corresponding mechanism. Instead, due to the choice of the biasing force according to the disclosure herein, such retraction is automatically effected.

Moreover, when the cargo support of the disclosure herein rolls with its wheels over a step such as the light strip and thereafter impinges onto the floor surface adjacent to the strip, the point loads applied by the wheel members will also be limited, since in case the forces applied in such situations on the wheel members exceed the biasing force, the wheel members will be retracted and the support sections will get into contact with the floor surface so that high point loads are prevented as well.

In a preferred embodiment, the biasing member is configured such that the biasing force exceeds the maximum gravitational force by 40% at most, preferably by 30% at most, which acts on the wheel member and pushes it towards the retracted position when the wheel members are placed on a floor surface and one or more cargo elements are placed on the support surface having the maximum allowable weight of the one or more cargo elements for the cargo support. When these values are chosen, the wheel assembly is even more sensitive to situations where the applied forces exceed the limit at which the floor surface on which the cargo support is currently resting, may be damaged due to too high point loads.

Furthermore, it is preferred that in each wheel assembly the steering axis and the rotation axis are arranged such that when seen in the support plane the rotation axis is at a distance from the steering axis. Thus, in a preferred embodiment the rotation axis of the wheel member is eccentrically arranged relative to the steering axis, which has the effect that the wheel members align themselves to the direction along which the cargo support is maneuvered by a user.

In a further preferred embodiment, each wheel assembly comprises a mount member fixedly supported on the base member and a carrier assembly, wherein the carrier assembly is rotatably supported on the mount member about the steering axis of the wheel assembly and the wheel member of the wheel assembly is rotatably supported about the rotation axis on the carrier assembly. When the wheel assemblies comprise a mount member and a carrier assembly being separate from the base member, the wheel assemblies can easily be replaced in case of a malfunction.

Furthermore it is preferred, that the carrier assembly comprises a carrier member rotatably coupled to the mount member about the steering axis, and an arm member, wherein a first end of the arm member is pivotably connected to the carrier member about a pivot axis which is parallel to the rotational axis, and a second end of the arm member opposite the first end carries the wheel member, and wherein the biasing member is arranged between the carrier member and the arm member. With such configuration where the wheel member is supported on the distal end of a pivotably mounted arm member, the biasing member can be formed in a simple manner such as in the form of a helical spring or the gas spring, the biasing force of which can precisely be adjusted. Thus, with such kind of mechanism the threshold defined by the biasing force at which the wheel members move to the retracted position, can easily be adapted to the specific conditions of the cargo support at issue.

In another preferred embodiment, the wheel member comprises a first wheel and a second wheel which are spaced along the rotational axis and supported on a shaft member, wherein the arm member and/or the biasing member extends between the first and second wheels. With such arrangement the contact surface between the wheel member and the floor surface can be enlarged. In addition, such arrangement allows to arrange the carrier assembly, such as the carrier member and the arm member, and or the biasing member in the center of the wheel assembly which in turn is a space-saving arrangement for a given contact area.

In another preferred embodiment the biasing member is formed as ring member, preferably a circular ring member, wherein the ring member extends in a plane perpendicular to the pivot axis, wherein the ring member is arranged between the carrier member and the arm member, wherein the ring member is supported on the arm member at a point spaced from the pivot axis and on the carrier member such that when the arm member pivots towards the mount member, the ring member is elastically deformed. Since the biasing forces are significant, which have to be chosen so as to fulfil the above requirement that the wheel members move to the retracted position only in those cases where the maximum gravitational forces occurring with a maximum weight on the support surface of the cargo support is exceeded, the biasing member must have a significant stiffness which can be achieved in a simple manner when using a ring member, preferably formed of steel, as a biasing member.

Moreover, it is preferred that when seen along the pivot axis the cross section of the carrier member has a coupling section extending perpendicularly to the steering axis and being rotatably coupled to the mount member, and an arm section extending away from the mount member with a distal end spaced from the coupling section along the steering axis, wherein the first end of the arm member is pivotably coupled to the distal end of the arm section, and wherein the ring member is supported on the coupling section. With the coupling section extending perpendicularly to the steering axis a support portion for the upper part of the ring member is provided so that it is supported on the one hand by the coupling portion and on the other hand by the arm member. This in turn allows for the ring member to be squeezed when the wheel member moves towards the retracted position by a pivoting movement of the arm member. In this way the required deformation of the wheel member generating the biasing force can be achieved in a mechanically simple manner.

Finally, it is preferred that the first end of the arm member is coupled to the carrier member by a bolt member, wherein the wheel member comprises a shaft member which is carried by the arm member at its second end, and wherein the ring member is support via the bolt member and the shaft member. In such arrangement the bolt member and the shaft member may directly or indirectly supported the ring member. In particular, it is conceivable that the shaft member and the board member carry brackets which in turn supports the ring member. Since the in such arrangement the ring member either arrests on the boat member and the shaft member just along a narrow line or the bracket pivots to get well maybe may pivot relative to the arm member the friction between the ring member and its support during the formation is significantly reduced. This in turn allows that the above-mentioned threshold can precisely be adjusted and not is not altered due to friction effects.

BRIEF DESCRIPTION OF THE DRAWINGS

In the following, a preferred embodiment of the disclosure herein is described with respect to the drawings.

DETAILED DESCRIPTION

Figure 1:
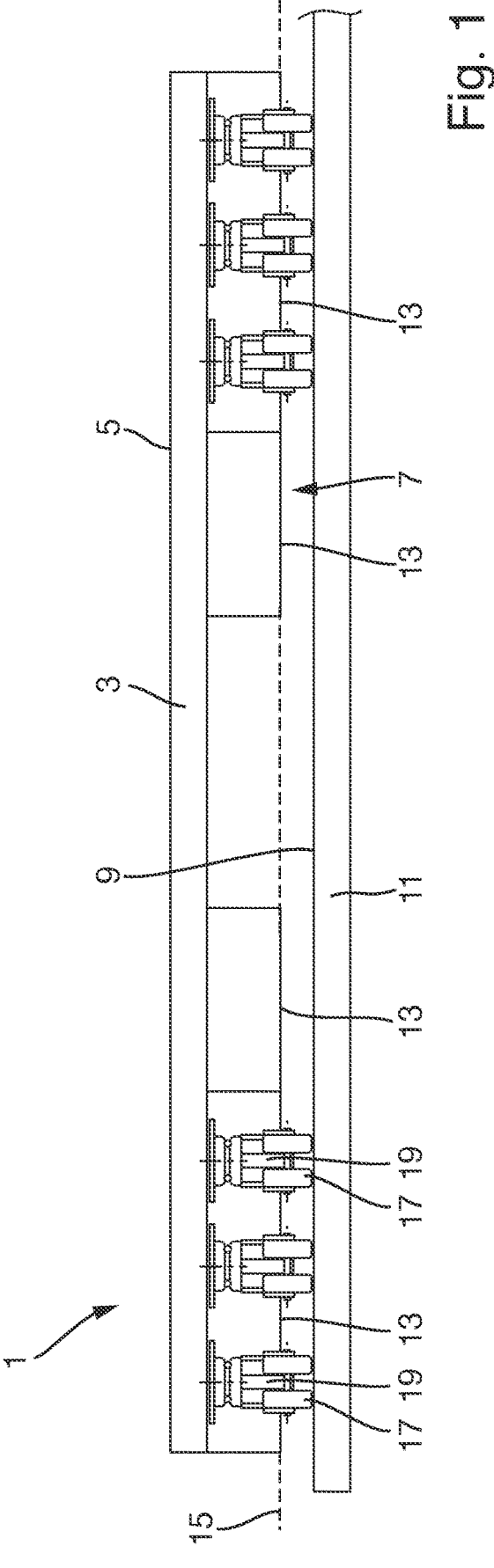
FIG. 1 shows a vertical cross-sectional view of the preferred embodiment of a cargo support with the wheel members in the extended position.

As can be taken from FIG. 1 the preferred embodiment of a cargo support 1 according to the disclosure herein comprises a base member 3 which is essentially planar and formed as a rigid body comprising an upper support surface 5 and a downwardly pointing bottom surface 7 which during normal use of the cargo support 1 may face a floor surface 9 of the floor 11 of a cargo hold or passenger cabin. The bottom surface 7 comprises a plurality of support sections 13 which extend in a common support plane 15. The bottom surface 7 of the base member 3 is further configured such that it does not comprise any rigid elements which permanently project beyond the support plane 15, i.e., the base member 3 may rest on the floor surface 9 of the floor 11 when the wheel members 17 of the wheel assemblies 19 are in a retracted position as it will be discussed in more detail below.

Figure 2:
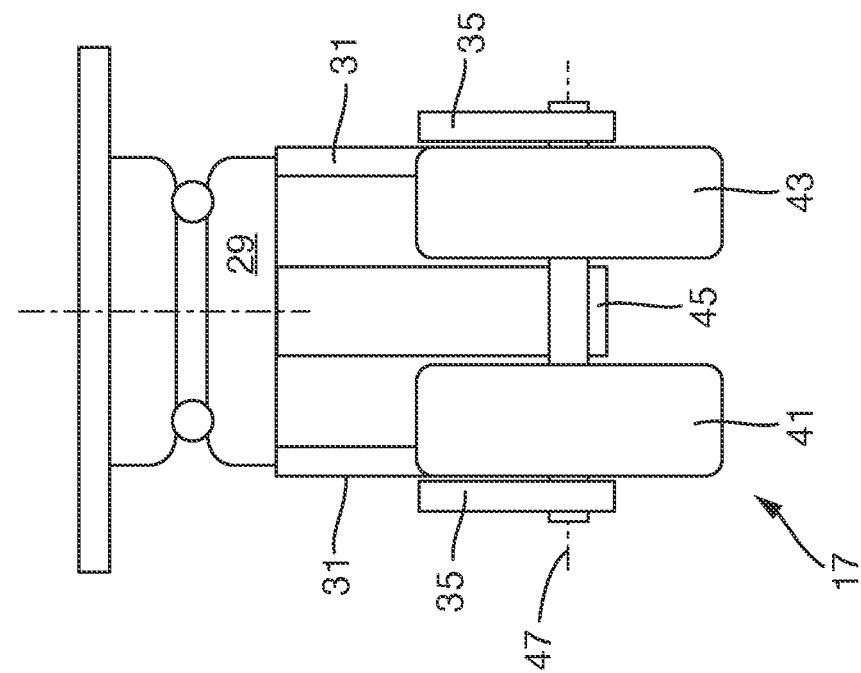
FIG. 2 shows a lateral view and a rear view of a first alternative of a wheel assembly for the embodiment of a cargo support of FIG. 1.
Figure 2:
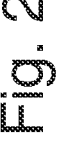
Figure 2:
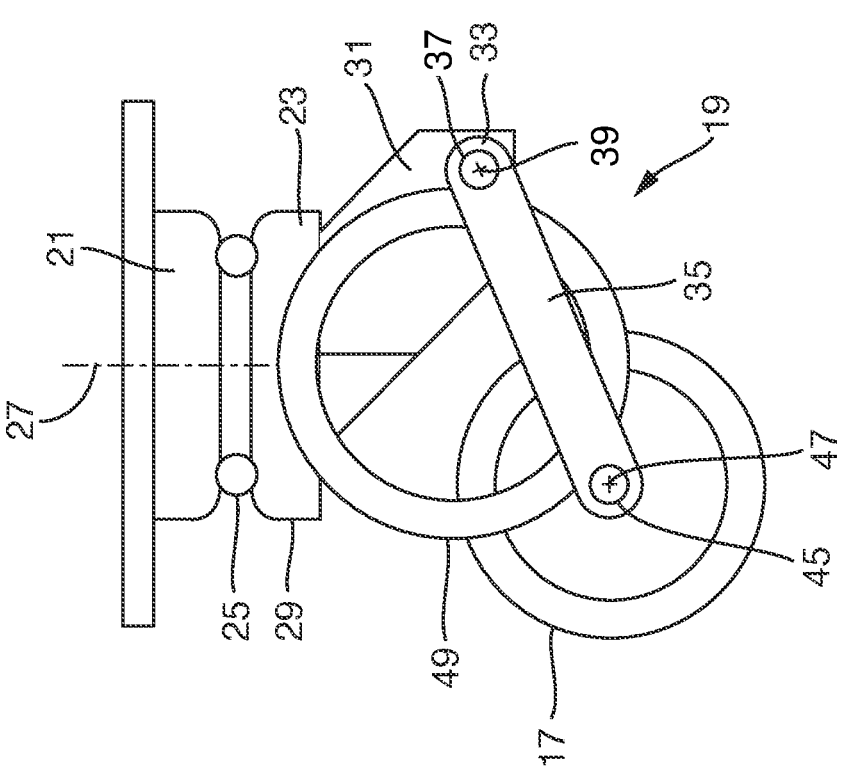

A first alternative of the configuration of the wheel assemblies 19 arranged in the bottom surface 7 of the cargo support 1 of FIG. 1 is shown in detail in FIG. 2. As can be taken from FIG. 2 the wheel assembly 19 comprises a mount member 21 which is configured to be fixedly attached in a recess in the bottom surface 7 of the base member 3. On the bottom side of the mount member 21 a carrier member 23 is rotatably mounted via a bearing 25 so that the carrier member 23 may rotate about the amount member 21 about a steering axis 27. In the present embodiment the carrier member 23 may rotate and not just pivot relative to the mount member 21. However, for the disclosure herein it would suffice when just a pivot movement within a limited angular range would be possible for the carrier member 23.

The carrier member 23 comprises a coupling section 29 which when looking at the cross-section parallel to the steering axis 27 essentially extends perpendicularly to the steering axis 27 and is rotatably coupled to the mount member 21. Attached to the coupling section 29 are arm sections 31, which extend away from the mount member 21, the arm sections 31 having a distal end 33 at which arm members 35 are pivotably mounted via a bolt member 37 so that the arm members 35 may pivot relative to the arm sections 31 and hence the carrier member 23 about a pivot axis 39 extending perpendicularly to the steering axis 27. The pivot axis 39 also extends in parallel to the common support plane 15. The carrier member 23 and the arm members 35 form a carrier assembly which is rotatable relative to the mount member 21 and which rotatably supports the wheel member 17.

Whereas a first end of the arm members 35 is pivotably coupled to the arm sections 31 and hence the carrier member 23, a second end of the arm members opposite the first end carries the wheel member 17 wherein in this preferred embodiment the wheel member 17 comprises a first wheel 41 and a second wheel 43 which are supported by a shaft member 45 that defines the rotational axis 47 about which the wheels 41, 43 and hence the wheel member 17 may rotate. As can be seen in FIG. 2 the rotational axis 47 and the pivot axis 39 are parallel to each other.

Moreover, as can be taken from FIG. 2, the projection of the rotation axis 47 on the common support plane 15 is spaced from the point where the steering axis 27 intersects the common support plane 15. Hence, when seen in the support plane 15 the rotation axis 47 and the steering axis 27 are at a distance from each other or spaced apart, and the wheels 41, 43 are eccentrically mounted with respect to the steering axis 27. Such arrangement has the advantage that when the cargo support 1 is maneuvered along a certain predetermined direction the wheel members 17 will align themselves with this direction.

Finally, as shown in FIG. 2 the wheel assembly 19 comprises a biasing member in the form of a ring member 49, which in this preferred embodiment is circular and formed of steel. The ring member 49 is supported on the one hand by the bolt member 37 and the shaft member 45 and on the other hand by the coupling section 29. Further, the ring member 49 is arranged between the first and second wheels 41, 43 in the gap formed between them. The ring member 49 extends in a plane perpendicular to the pivot axis (39).

So, the ring member 49 is arranged between the carrier member 23 and the arm member 35 and supported on the arm member 39 at a point spaced from the pivot axis 39 and on the carrier member 23 such that when the arm member 35 pivots towards the mount member 21, the ring member 49 is elastically deformed.

When the ring member 49 is in the un-deformed state as shown in FIG. 2, the wheels 41, 43 are in an extended position and extend beyond the common support plane 15, as can be seen in FIG. 1. However, when a sufficiently high force acts on the wheels 41, 43 pushing them towards the coupling section 29 and the mount member 21, the ring member 49 will elastically be deformed and the arm members 35 pivot towards the coupling section 29 so that the wheels 41, 43 are retracted from the support plane 15 towards the support surface 5 and they do not extend beyond the support plane 15 but are received in the recesses in the base member 3 and assume a retracted position. However, when the wheels 41, 43 are in this retracted position, the ring member 49 acts as a biasing member which applies a biasing force to the wheels 41, 43 which forces them towards the extended position.

Thus, the position of the wheels 41, 43 may be altered between an extended position and a retracted position against the biasing force of the biasing member in the form of the ring member 49, the biasing force mainly acting along the steering axis 27.

The ring member 49 is dimensioned in such a manner that the biasing force it applies to the wheel member 17 and the wheels 41, 43 in the direction of the steering axis 27 towards the extended position has such a magnitude that it exceeds the maximum gravitational force by 50% at most which acts on the wheel member 17 and forces it towards the retracted position when all the wheel members 17 of the cargo support 1 are placed on the floor surface 11 and one or more cargo elements are placed on the support surface 5 having the maximum allowable weight of the one or more cargo elements for the cargo support. It is preferred when the biasing member in the form of the ring member 49 is configured such that the biasing force it applies exceeds the maximum gravitational force by 40% at most, more preferably by just 30% at most. With such preferred configuration the wheel assembly 19 is even more sensitive to situations where the applied forces exceed the limit at which the floor 11 on which the cargo support 1 is currently resting, may be damaged.

Figures 6A, 6B:
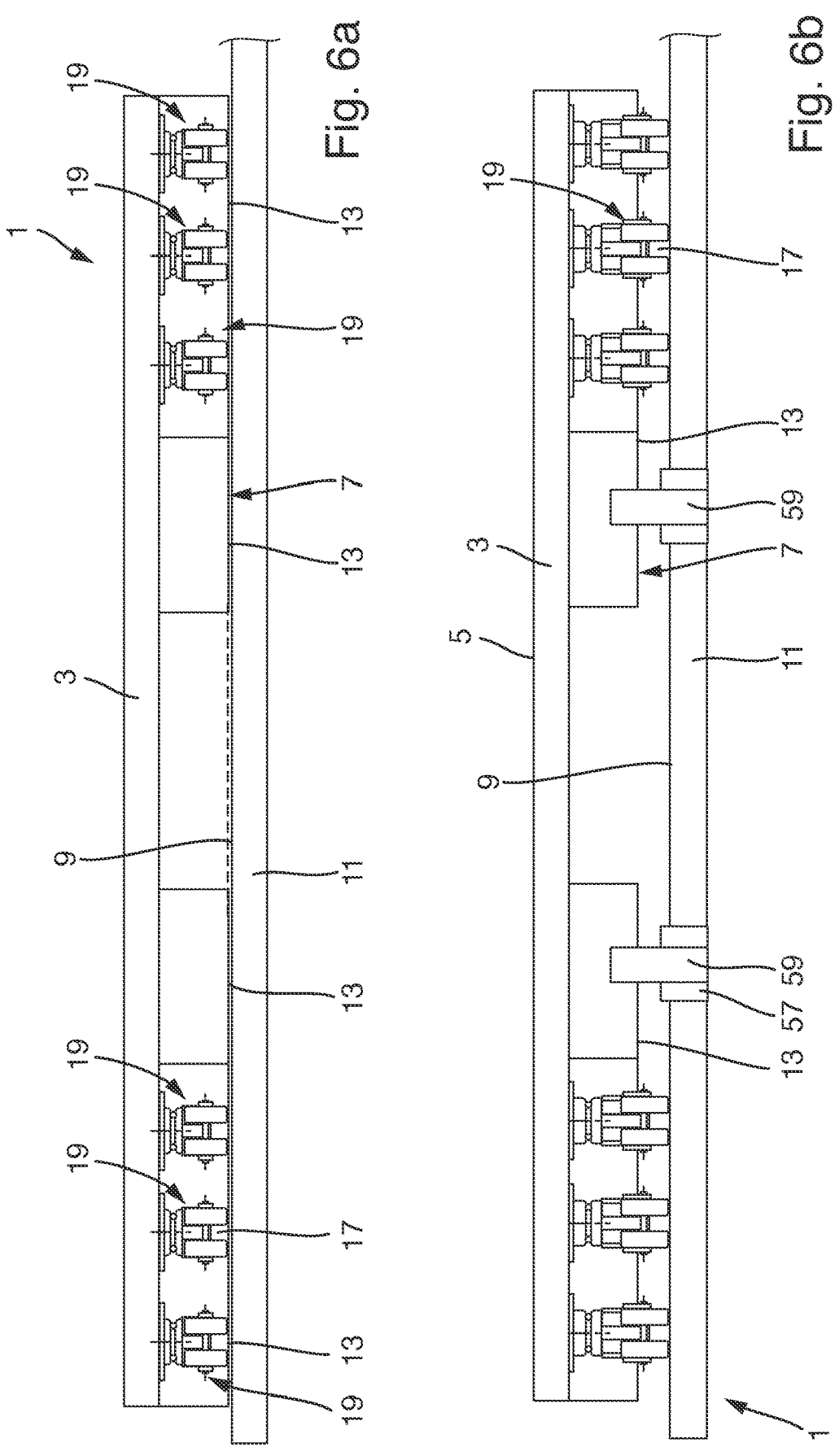
FIG. 6*a* shows a cross-sectional view of the embodiment of FIG. 1 with the support sections being in contact with a floor surface.
FIG. 6*b* shows a cross-sectional view of the embodiment of FIG. 1 with locking elements being in the engagement with the base member.

Thus, when the support surface 5 of the embodiment of the cargo support 1 carries a cargo element having the maximum allowable weight for the cargo support 1, the wheel members 17 will still be in the extended position and project beyond the common support plane 15, so that the cargo support 1 can be maneuvered over a floor surface 9 with the wheels 41, 43 rolling over the surface 9. However, when the embodiment of the cargo support 1 is subjected to additional forces, e.g., during landing, which act also parallel to the steering axis 27 and which add up to the already mentioned gravitational forces, the biasing force of the ring member 49 is exceeded, so that the wheel members 17 will move from the extended position to the retracted position, and the support sections 13 on the bottom surface 7 of the base member 3 will come into contact with the floor surface 9, as it is shown in FIG. 6a. Thus, the entire cargo support 1 is then no longer supported by the wheel members 17 only but by the support sections 13, so that high point loads to which the floor surface 9 will be subjected at the positions of the wheels 41, 43, are avoided. Instead, the entire load due to the cargo unit 1 is then transferred to the floor surface 11 via the support sections 13 having a much larger contact surface.

Figure 3:
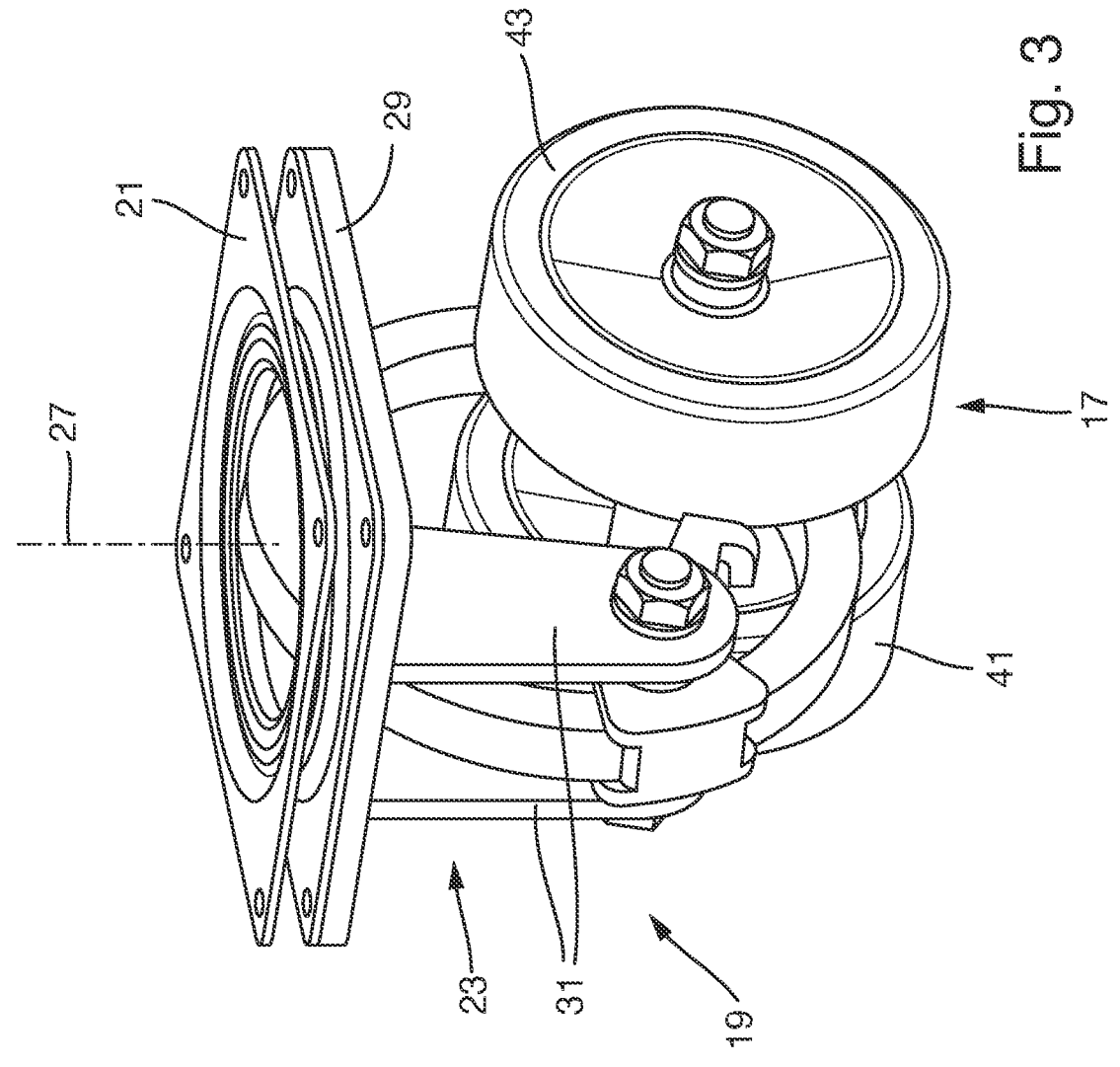
FIG. 3 shows a perspective view of a second alternative of a wheel assembly for the embodiment of FIG. 1.
Figure 4:
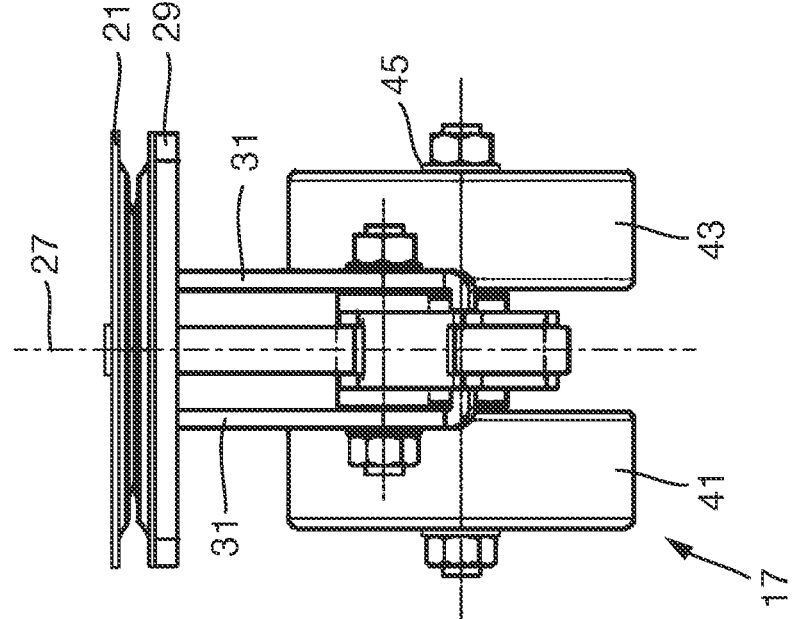
FIG. 4 shows cross-sectional views of the alternative of a wheel assembly shown in FIG. 3.
Figure 4:
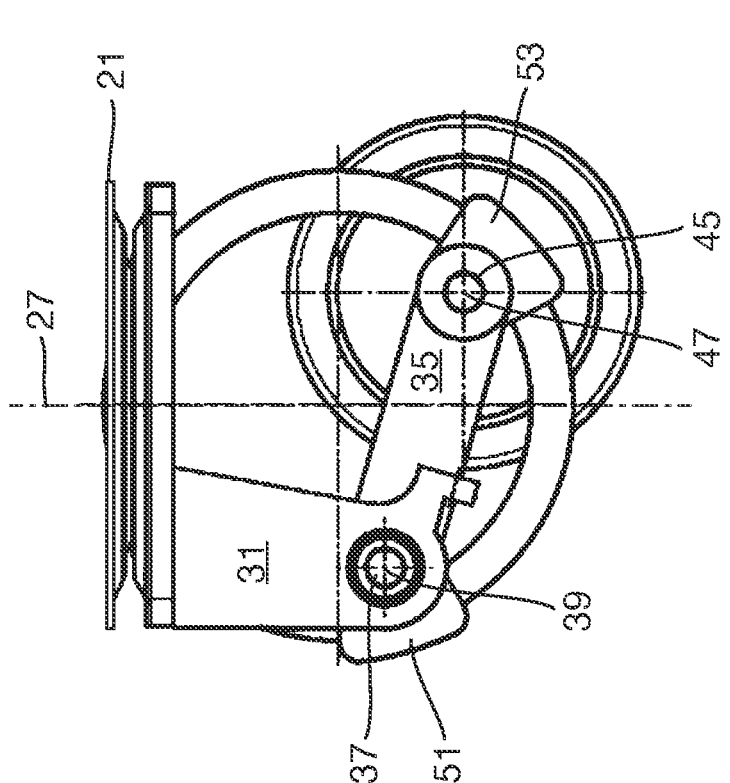

FIGS. 3 and 4 show an alternative configuration of the wheel assembly 19 to be mounted in the bottom surface 7 of the base member 3. However, this second alternative does not essentially differ from the first alternative shown in FIG. 2. It also comprises a mount member 21 which is adapted to be fixedly mounted on the base member 3. Rotatably coupled to the mount member 21 about a steering axis 27 is a carrier member 23 comprising a coupling section 29 and arm sections 31, the coupling section 29 extending essentially perpendicularly to the steering axis 27 and the arm sections 31 extending away from the mount member 21 and having a distal end spaced from the coupling section 29 along the steering axis 27.

At the distal end of the arm sections 31 arm members 35 are pivotably supported about a pivot axis 39 via bolt members 37. Hence, also in this case the first end of the arm members 35 is supported at the distal end of the arm sections 31 by bolt members 37, and the second end of the arm members 35 carries shaft members 45 which define a rotational axis for first and second wheels 41, 43 which are supported on the shaft members 45 and which form a wheel member 17. As can further be taken from the left part of FIG. 4, the rotational axis 47 is spaced from the steering axis 27 when seen in the support plane 15, so that also in this alternative the rotational axis 47 is eccentrically arranged relative to the steering axis 27.

As can be taken from FIGS. 3 and 4, both the bolt members 37 and the shaft members 45 each carry a bracket 51, 53, and the ring member 49 which also in this alternative acts as a biasing member is supported in the brackets 51, 53. Thus, in this embodiment the ring member 49, which is also arranged between the wheels 41, 43, is not directly supported on the bolt members 37 and the shaft members 45 but carried by additional brackets 41, 43 so that the bolt members 37 and the shaft members 45 only indirectly carry the ring member 49.

In this second alternative the ring member 49 is also dimensioned such that the biasing force it applies to the wheels 41, 43 in the direction of the steering axis 27 towards the extended position has such a magnitude that it exceeds that force by X % at most which acts on the wheel member 17 and forces it towards the retracted position when all the wheel members 17 of the cargo support 1 are placed on the floor surface 11 and cargo elements having the maximum allowable weight are placed on the support surface 5. Therefore, when using this second alternative of a wheel assembly 19 in the cargo support 1 the same behavior as described above will be achieved, i.e., when in addition to the gravitational forces further inertia forces act in the direction of the steering axis 27, the wheel members 17 will be pushed towards the retracted position against the biasing force applied by the ring member, and the support sections 13 will get into contact with the floor surface so as to reduce the point loads.

Figure 5:
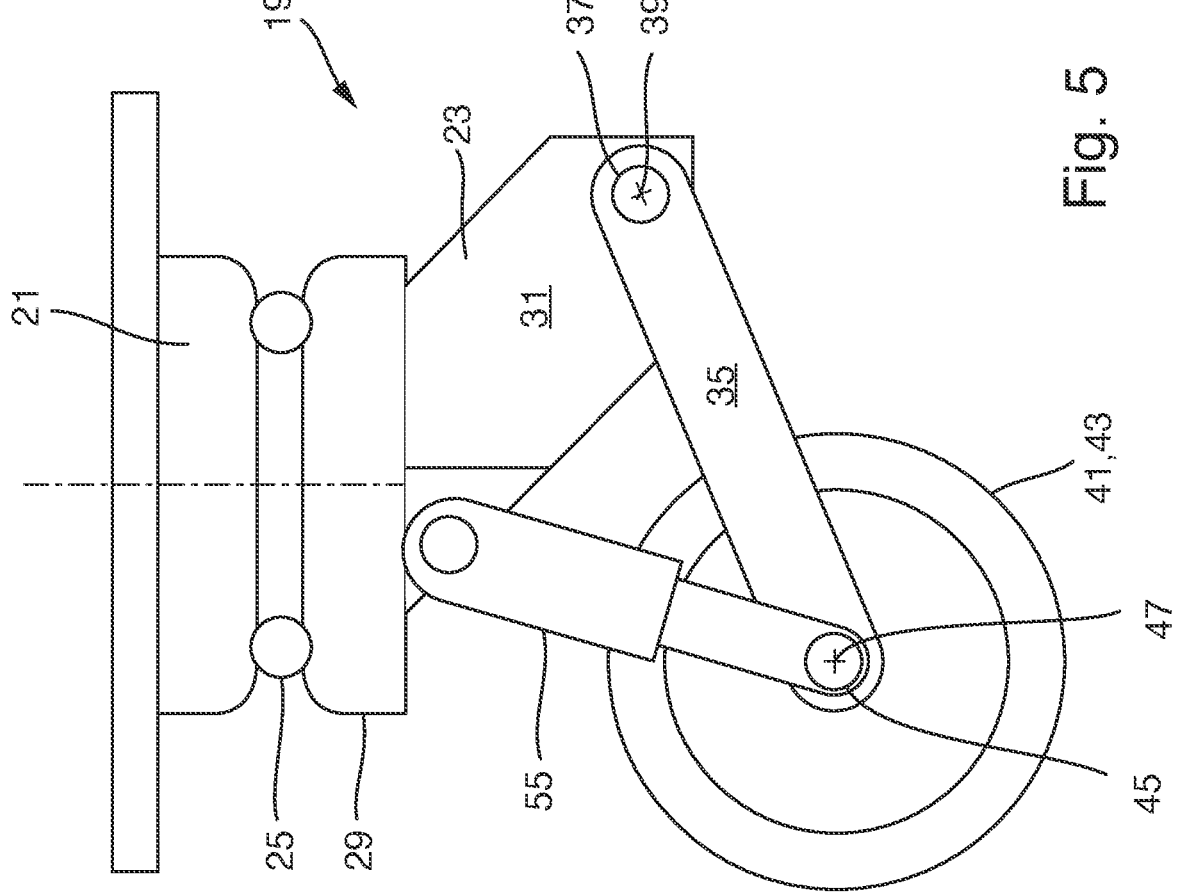
FIG. 5 shows cross-sectional views of a third alternative of a wheel assembly.

Finally, FIG. 5 shows a further alternative of a wheel assembly 19 to be coupled with the base member 3 of the cargo unit 1 of the disclosure herein.

It also comprises a mount member 21 which is adapted to be fixedly mounted on the base member 3. A carrier member 23 comprising a coupling section 29 and arm sections 31 is rotatably coupled to the mount member 21 about a steering axis 27 via a bearing 25. The coupling section 29 extends essentially perpendicularly to the steering axis 27 and the arm sections 31 project away from the mount member 21 and have a distal end spaced from the coupling section 29 along the steering axis 27. On the distal ends of the arm sections 31 arm members are pivotably supported about a pivot axis 39 via bolt members 37. So, also in this third alternative the first end of the arm members 35 is supported at the distal end of the arm sections 31 by bolt members 37, and the second end of the arm members 35 carries a shaft member 45 which defines a rotational axis 47 for first and second wheels 41, 43 which are supported on the shaft member 45 and which form a wheel member 17.

As can further be taken from FIG. 5, the rotational axis 47 is spaced from the steering axis 27 when seen in the support plane 15, so that also in this third alternative the rotational axis 47 is eccentrically arranged relative to the steering axis 27.

In this third alternative of a wheel assembly 19 a gas spring 55 is employed as a biasing member rather than a ring member, the gas spring 55 being arranged between the distal end of the arm member and 35 and the arm section 31. In particular, the gas spring 55 is coupled to the distal end of the arm member 35 via the shaft member 45, which also carries one end of the gas spring 55. Thus, it is also possible to use linearly acting biasing members for applying the biasing force onto the wheel members 17.

In particular, also in this third alternative the biasing member in the form of the gas spring 35 is dimensioned such that the biasing force it applies to the wheels 41, 43 in the direction of the steering axis 27 towards the extended position has such a magnitude that it exceeds that force by X % at most which acts on the wheel member 17 and forces it towards the retracted position when all the wheel members 17 of the cargo support 1 are placed on the floor surface 11 and cargo elements having the maximum allowable weight are placed on the support surface 5.

Therefore, when using also this third alternative of a wheel assembly 19 in the cargo support 1 the same behavior as described above will be achieved, i.e., when in addition to the gravitational forces further inertia forces act in the direction of the steering axis 27, the wheel members 17 will be pushed towards the retracted position against the biasing force applied by the ring member, and the support sections 13 will get into contact with the floor surface so as to reduce the point loads.

Besides the scenario described with respect to FIGS. 1 and 6a other scenarios are also conceivable where the afore-mentioned configuration with wheel assemblies 19 having wheels members 17 that are forced towards an extended position via a biasing member that is chosen such that the force it applies exceeds the gravitational forces by only a small amount, prevents sections of a floor from being damaged by high point loads applied by the wheel members 17.

Figures 7A, 7B:
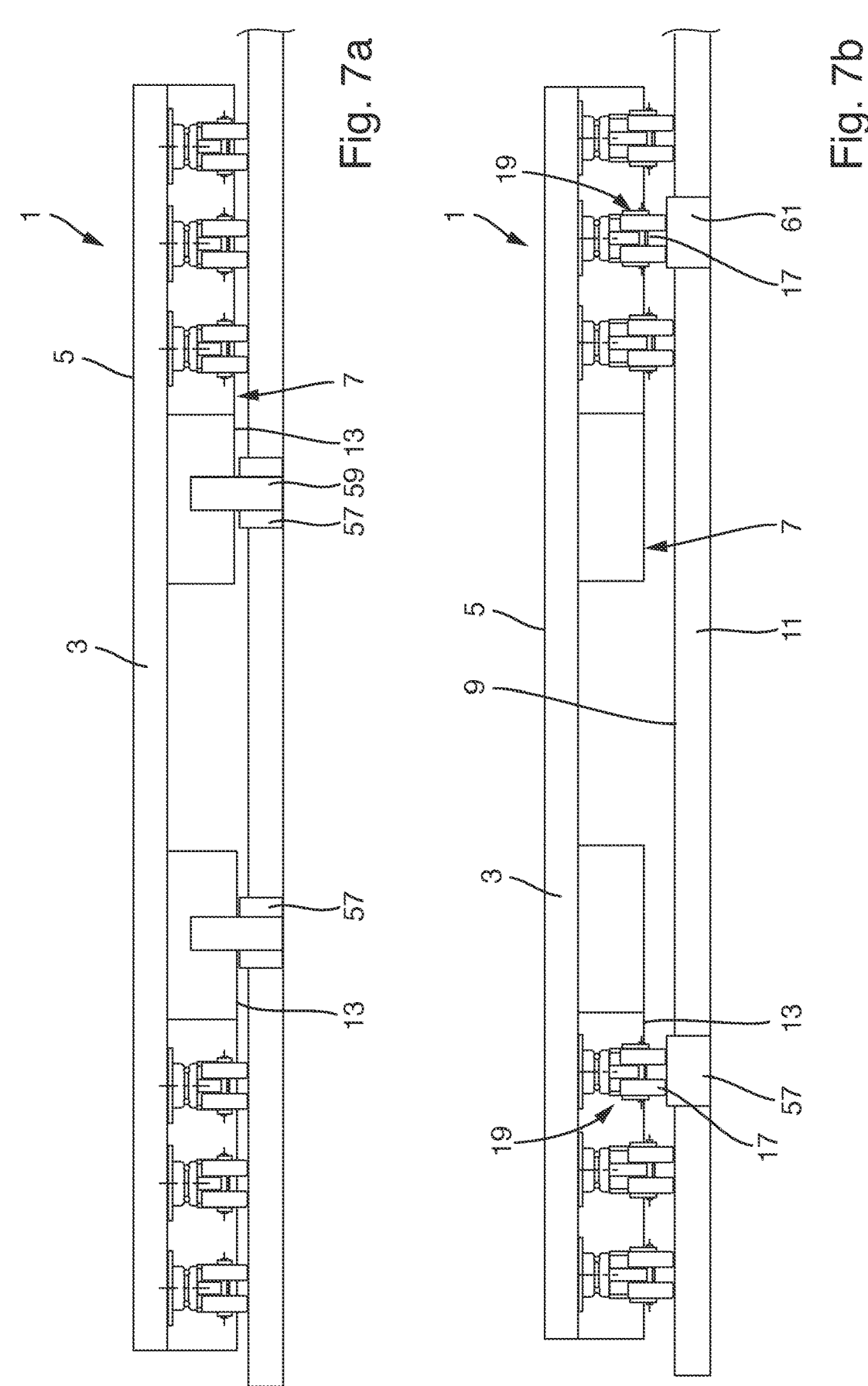
FIG. 7*a* shows a cross-sectional view of the embodiment of FIG. 1 with locking elements being in engagement with the base member and support sections being in contact with a rail member.
FIG. 7*b* shows a cross-sectional view of the embodiment of FIG. 1 with wheel members contacting projecting seat rails.

As it is shown in FIGS. 6b and 7a the cargo support 1 may also be positioned above seat rails 57 in the floor 11 having locking members 59 inserted therein, wherein the cargo unit 1 is positioned such that the locking members 59 engage with recesses in the support section 13 of the cargo unit 1 and prevent the cargo unit 1 from being moved relative to the floor surface 9. When in such case in addition to the gravitational forces due to the weight of cargo elements arranged on the support surface 5 further inertia forces act on the cargo support 1 in a direction parallel to the steering axis 27, the wheel members 17 of the wheel assemblies 19 are pushed towards the retracted position since the biasing force generated by the biasing the members does not suffice anymore to keep the support sections 13 spaced from the seat rails 57. Instead, the support sections 13 approach the seat rails 57 and get into contact with them. Hence, when large forces occur in such situation, a high point loads due to the wheel members 17 are avoided since the support sections 13 contact the seat rails 57.

Finally, in FIG. 7b another situation is shown in which with the cargo unit 1 of the disclosure herein it can be avoided that high point loads are applied onto a floor surface 9 by the wheel members 17. In this case some wheel members 17 of wheel assemblies 19 are positioned on a light strip 61 or seat rail 57. However, due to the choice of the biasing force of the wheel assemblies 19 positioned on the rails, the respective wheel members 17 will be pushed towards the retracted position so that the other wheel members 17 will still contact the floor surface 9.

As can be taken from the above, with the embodiment of a cargo support 1 according to the disclosure herein it is prevented that high point loads due to the wheel members 17 on the bottom surface 7 of the cargo support 1 are applied to the floor surface 9 supporting the cargo support 1. In particular, it is not required that the wheel members 17 are actively retracted. Instead, the mechanism of the disclosure herein with a biasing member being chosen in the afore-mentioned way does not require an active adjustment of the wheel assemblies.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

1 cargo support
3 base member
5 support surface
7 bottom surface
9 floor surface
11 floor
13 support section
15 support plane
17 wheel member
19 wheel assembly
21 mount member
23 carrier member
25 bearing
27 steering axis 29 coupling section
31 arm section
33 distal end
35 arm member
37 bolt member
39 pivot axis
41 first wheel
43 second wheel
45 shaft member
47 rotational axis
49 ring member
51 bracket
53 bracket
55 gas spring
57 seat rail
59 locking member
61 light strip

The invention claimed is:

1. A movable cargo support for being received in a cargo hold or passenger cabin of an aircraft, the movable cargo support comprising:

a base having:

a support surface configured to support one or more cargo elements attached to and/or supported on the support surface; and a bottom surface, which is opposite the support surface and comprises one or more supports, which extend in a common support plane and are configured to support the base on a floor surface of the cargo hold or of the passenger cabin;

a plurality of wheel assemblies, each wheel assembly comprising a a at least one wheel that is configured to rest on the floor surface of the cargo hold or of the passenger cabin and is rotatable about a rotation axis that is parallel to the support plane;

wherein the at least one wheel of each of the plurality of wheel assemblies is movably mounted on the base, such that:

the at least one wheel pivots about a steering axis of that wheel assembly, which steering axis extends perpendicularly to the support plane; and the position of the at least one wheel parallel to the steering axis is configured to be altered between an extended position and a retracted position;

wherein, in the extended position, the at least one wheel protrudes beyond the support plane;

wherein, in the retracted position, the at least one wheel is retracted from the support plane towards the support surface, so that the at least one wheel does not extend beyond the support plane;

wherein each wheel assembly comprises a biasing member configured to bias the at least one wheel towards the extended position with a biasing force acting in a direction parallel to the steering axis; and wherein the biasing member is configured such that the biasing force is higher than a maximum gravitational force which acts on the at least one wheel and forces the at least one wheel towards the retracted position when:

the at least one wheel is on the floor surface of the cargo hold or of the passenger cabin; and one or more cargo elements, which have a maximum allowable weight for the cargo support, are on the support surface; and wherein the biasing force exceeds the maximum gravitational force by at most 50%.

2. The cargo support of claim 1, wherein:

the biasing member is configured such that the biasing force exceeds the maximum gravitational force by at most 40%; and the biasing force acts on the at least one wheel and pushes the at least one wheel towards the retracted position when the at least one wheel is on the floor surface of the cargo hold or of the passenger cabin and one or more cargo elements having the maximum allowable weight of the one or more cargo elements for the cargo support, are on the support surface.

3. The cargo support of claim 1, wherein, in each wheel assembly, the steering axis and the rotation axis are arranged such that, when seen in the support plane, the rotation axis is spaced apart from the steering axis, such that the rotation axis does not intersect with the steering axis.

4. The cargo support of claim 1, wherein:

each wheel assembly comprises:

a mount fixedly supported on the base; and a carrier assembly;

the carrier assembly is rotatably supported on the mount member about the steering axis of the wheel assembly; and the at least one wheel of the wheel assembly is rotatably supported about the rotation axis on the carrier assembly.

5. The cargo support of claim 4, wherein:

the carrier assembly comprises:

a carrier rotatably coupled to the mount about the steering axis; and an arm;

a first end of the arm is pivotably connected to the carrier about a pivot axis, which is parallel to the rotational axis;

a second end of the arm, which is member opposite the first end of the arm, carries the at least one wheel; and the biasing member is arranged between the carrier and the arm.

6. The cargo support of claim 5, wherein:

the at least one wheel comprises a first wheel and a second wheel;

the first wheel and the second wheel are spaced apart from each other along the rotational axis and supported on a shaft; and the arm and/or the biasing member extends between the first wheel and the second wheel.

7. The cargo support of claim 5, wherein the biasing member comprises a gas spring that extends between carrier and the arm.

8. The cargo support of claim 5, wherein:

the biasing member is formed as ring;

wherein the ring extends in a plane perpendicular to the pivot axis;

wherein the ring is arranged between the carrier and the arm; and the ring is supported on the arm at a point spaced apart from the pivot axis and on the carrier, such that, when the arm pivots towards the mount, the ring is elastically deformed.

9. The cargo support of claim 8, wherein:

when seen along the pivot axis, the cross section of the carrier has:

a coupling section, which extends perpendicularly to the steering axis and is rotatably coupled to the mount; and an arm section, which extends away from the mount, a distal end of the arm section being spaced apart from the coupling section along the steering axis;

the first end of the arm is pivotably coupled to the distal end of the arm section; and the ring is supported on the coupling section.

10. The cargo support of claim 8, wherein:

the first end of the arm is coupled to the carrier by a bolt;

wherein each of the wheel assemblies comprises a shaft, which is carried by the arm, at the second end of the arm; and wherein the ring is supported via the bolt and the shaft.

11. The cargo support of claim 1, wherein:

the biasing member is configured such that the biasing force exceeds the maximum gravitational force by at most 30%; and the biasing force acts on the at least one wheel and pushes the at least one wheel towards the retracted position when the at least one wheel is on the floor surface of the cargo hold or of the passenger cabin and one or more cargo elements having the maximum allowable weight of the one or more cargo elements for the cargo support, are on the support surface.

12. The cargo support of claim 5, wherein the biasing member comprises a helical spring that extends between the carrier and the arm.

13. The cargo support of claim 5, wherein:

the biasing member comprises a circular ring;

wherein the circular ring extends in a plane perpendicular to the pivot axis;

wherein the circular ring is arranged between the carrier and the arm; and the circular ring is supported on the arm at a point spaced apart from the pivot axis and on the carrier, such that, when the arm pivots towards the mount, the circular ring is elastically deformed.

14. The cargo support of claim 13, wherein:

when seen along the pivot axis, the cross section of the carrier has:

a coupling section, which extends perpendicularly to the steering axis and is rotatably coupled to the mount; and an arm section, which extends away from the mount, a distal end of the arm section being spaced apart from the coupling section along the steering axis;

the first end of the arm is pivotably coupled to the distal end of the arm section; and the circular ring is supported on the coupling section.

15. The cargo support of claim 13, wherein:

the first end of the arm is coupled to the carrier by a bolt;

each of the wheel assemblies comprises a shaft, which is carried by the arm, at the second end of the arm; and the circular ring is supported via the bolt and the shaft.

16. The cargo support of claim 1, wherein the at least one wheel is configured, while in the extended position, to pivot about the steering axis of that wheel assembly.

17. The cargo support of claim 1, wherein, by the at least one wheel being pivotable about the steering axis, the at least one wheel is steerable for at least two of the plurality of wheel assemblies.

18. The cargo support of claim 3, wherein the at least one wheel is eccentrically mounted with respect to the steering axis.

19. The cargo support of claim 18, wherein, when the cargo support is maneuvered along a predetermined direction, then at least one wheel is automatically aligned with this predetermined direction.

20. The cargo support of claim 3, wherein:

the at least one wheel is configured, while in the extended position, to pivot about the steering axis of that wheel assembly; and by the at least one wheel being pivotable about the steering axis, the at least one wheel is steerable for at least two of the plurality of wheel assemblies.

*  *  *  *  *